United States Patent [19]
Blevins et al.

[11] Patent Number: 5,155,807
[45] Date of Patent: Oct. 13, 1992

[54] MULTI-PROCESSOR COMMUNICATIONS CHANNEL UTILIZING RANDOM ACCESS/SEQUENTIAL ACCESS MEMORIES

[75] Inventors: Ballard J. Blevins, Lexington, Ky.; William G. Kulpa, Austin; Joseph R. Mathis, Georgetown, both of Tex.

[73] Assignee: International Business Machines Corporation, Armonk, N.Y.

[21] Appl. No.: 582,823

[22] Filed: Sep. 14, 1990

Related U.S. Application Data

[63] Continuation of Ser. No. 831,885, Feb. 24, 1986, abandoned.

[51] Int. Cl.⁵ .................................. G06F 13/00
[52] U.S. Cl. ......................... 395/200; 364/228.1; 364/230.6; 364/244; 364/244.8; 364/251; 364/252; 364/254.8; 364/260; 364/270.5; 364/270.6; 364/DIG. 1; 364/931.4; 364/940; 364/950; 364/959.1; 364/960; 364/964; 364/964.6; 364/965; 364/965.3; 364/965.9; 364/DIG. 2
[58] Field of Search ... 364/200 MS File, 900 MS File; 395/200

[56] References Cited

U.S. PATENT DOCUMENTS

| | | | |
|---|---|---|---|
| 3,710,349 | 1/1973 | Miwa et al. | 364/200 |
| 4,122,531 | 10/1978 | Tamara et al. | 364/900 |
| 4,277,836 | 7/1981 | Kawakami | 364/900 |
| 4,298,928 | 11/1981 | Etoh et al. | 364/200 |
| 4,310,879 | 1/1982 | Pandeya | 364/200 |
| 4,347,587 | 8/1982 | Rao | 365/189 |
| 4,384,322 | 5/1983 | Bruce et al. | 364/200 |
| 4,539,636 | 9/1985 | Saaksjarvi | 364/200 |
| 4,541,076 | 9/1985 | Bowers et al. | 365/190 |
| 4,562,435 | 12/1985 | McDonough et al. | 340/798 |
| 4,628,436 | 12/1986 | Okamoto et al. | 364/131 |
| 4,639,890 | 1/1987 | Heilveil et al. | 364/900 |
| 4,691,280 | 9/1987 | Bennett | 364/200 |
| 4,718,039 | 1/1988 | Aichelmann, Jr. et al. | 364/900 |
| 4,723,226 | 2/1988 | McDonough et al. | 365/189 |
| 4,731,758 | 3/1988 | Lam et al. | 365/189 |

OTHER PUBLICATIONS

"Supplement to MOS Memory Data Book 1984", Texas Instruments, pp. 5-3 through 5-10.

*Primary Examiner*—David L. Clark
*Assistant Examiner*—Maria N. Von Buhr
*Attorney, Agent, or Firm*—Walter J. Madden, Jr.; Mark E. McBurney

[57] ABSTRACT

A system for transferring data between a pair of data processing units having system buses includes a plurality of memories in each of the data processing units; each memory having a random access portion and an associated sequential access portion; means for transferring data between each of the random access portions of each of the memories and its associated sequential access portion; and means connecting the sequential access portions of each of the memories in one of the data processing units to the sequential access portions of the other of said data processing units to permit data flow therebetween; the data flow between the sequential access portions of said memories occurring asynchronously of the remainder of the system so that the data processing units can utilize their system buses during such data flow.

2 Claims, 4 Drawing Sheets

PRIOR ART MULTIPROCESSOR SYSTEM

MULTI-PROCESSOR COMMUNICATIONS CHANNEL UTILIZING RANDOM ACCESS/SEQUENTIAL ACCESS MEMORIES

This application is a continuation of application Ser. No. 06/831,885, filed Feb. 24, 1986 now abandoned.

CROSS-REFERENCE TO RELATED APPLICATIONS

Co-pending application, Ser. No. 826,649 filed Feb. 2, 1986, entitled "Data Processing System Using Video RAMS", and assigned to the same assignee as the present application, discloses a system using video RAMS to control the flow of data between a processor and an input/output adapter to which one or more input/output devices are connected.

BACKGROUND

1. Field of the Invention

This invention relates to improvements in data processing systems having interconnected multiple processors between which data and control information is exchanged.

2. Prior Art

One mechanism that is frequently used to increase the processing capability of a system is the use of multiprocessing, i.e., the addition of a second or third processor. This increases the number of computer instructions per second available to apply to a task. The interconnection channel typically will consist of a parallel bus, with the transfer being storage-to-storage in nature. Frequently the transfer will be the movement of large "blocks" of data from the storage of one processor to the storage of another processor. The data rate of this transfer is of major concern; if it is too slow, the full advantage of multiple processors is not achieved; if it is too fast, it will tend to stop effective processing of both processors and impact any time dependent operations such as I/O devices, interrupt processing, etc.

One of the problems associated with a multiprocessor system is that the system designer must carefully balance the transfer speed and block size of the processor-to-processor transfer such that neither processor is "locked out" during the transfer, while getting maximum benefit from the additional processors.

In a typical system structure, access to the storage subsystem is through a common address and data bus. Thus, all transfers between processors will directly reduce the available storage bandwidth, and hence never obtain the maximum potential benefit inherent in the multiprocessor system structure. Any "lock out" and reduced processing capability may increase interrupt latency beyond desirable or acceptable limits.

A block diagram showing the data flow for a conventional prior art processor-to-processor transfer is contained in FIG. 1. In this example, two processor subsystems are shown with data flowing from P1 to P2. Neglecting initialization and transfer ending service, the data transfer sequence can be subdivided into 3 operations as follows:

1. This phase of the operation reads data from the storage unit of processor P1 and transfers it to the interface network of P1. During this phase, processor P1 is prohibited from accessing its system bus.

2. The second phase of the operation concerns itself with the transfer of data over a processor-to-processor channel.

3. The data is written into the storage unit of processor P2 during the third phase of the operation. During this phase, processor P2 is prohibited from accessing its system bus.

If the system is designed to maximize the processor-to-processor transfer rate, then both processors P1 and P2 will be prohibited from accessing their internal busses during all three phases of the operation for the duration of the block transfer. Both P1 and P2 will be locked out of their respective storage units, and thus stopped from executing instructions during the transfer.

The system can be designed to distribute the interference over a period of time. Access to the storage unit by the processor-to-processor interface network may be interleaved with other activity within the respective system, such as instruction fetching or direct memory access DMA traffic, for example. In this environment, processors P1 and P2 will be stopped only during phases 1 and 3, respectively. Thus, instruction execution would continue, but at a reduced rate. Compared to the previous example, the interference will occur over a longer period of time with the accumulated or total interference being greater due to the asynchronous nature of the two activities (instruction execution and the transfer operation) and losses due to repeated arbitration at the internal system bus.

In either example, interference to the processor is directly proportional to the amount of data transferred.

SUMMARY OF THE INVENTION

The present invention is directed to an efficient mechanism to interconnect multiple processors to permit the transfer of data and control information without the large impacts on processor performance usually associated with this operation. Described herein is the definition and implementation of an alternate communication channel for the interconnection of multiple processors within a data processing system.

The channel involved in the present invention is based on the video random access memory (VRAM) storage technology. The video RAM is a dynamic RAM which provides access to a "word" shift register internal to the chip through a serial port. Thus, the video RAM provides two data ports, the conventional random access port of a dynamic RAM and the serial or sequential access port unique to the video RAM. Video RAMs are currently available from Texas Instruments as part No. TMS4161. The Texas Instrument memory is described in the "Supplement to MDS Memory Data Book 1984" in a section entitled "Dual Port Memory With High Speed Serial Access," pages 5-3 to 5-10.

DESCRIPTION OF THE PREFERRED EMBODIMENT

Figure 1:
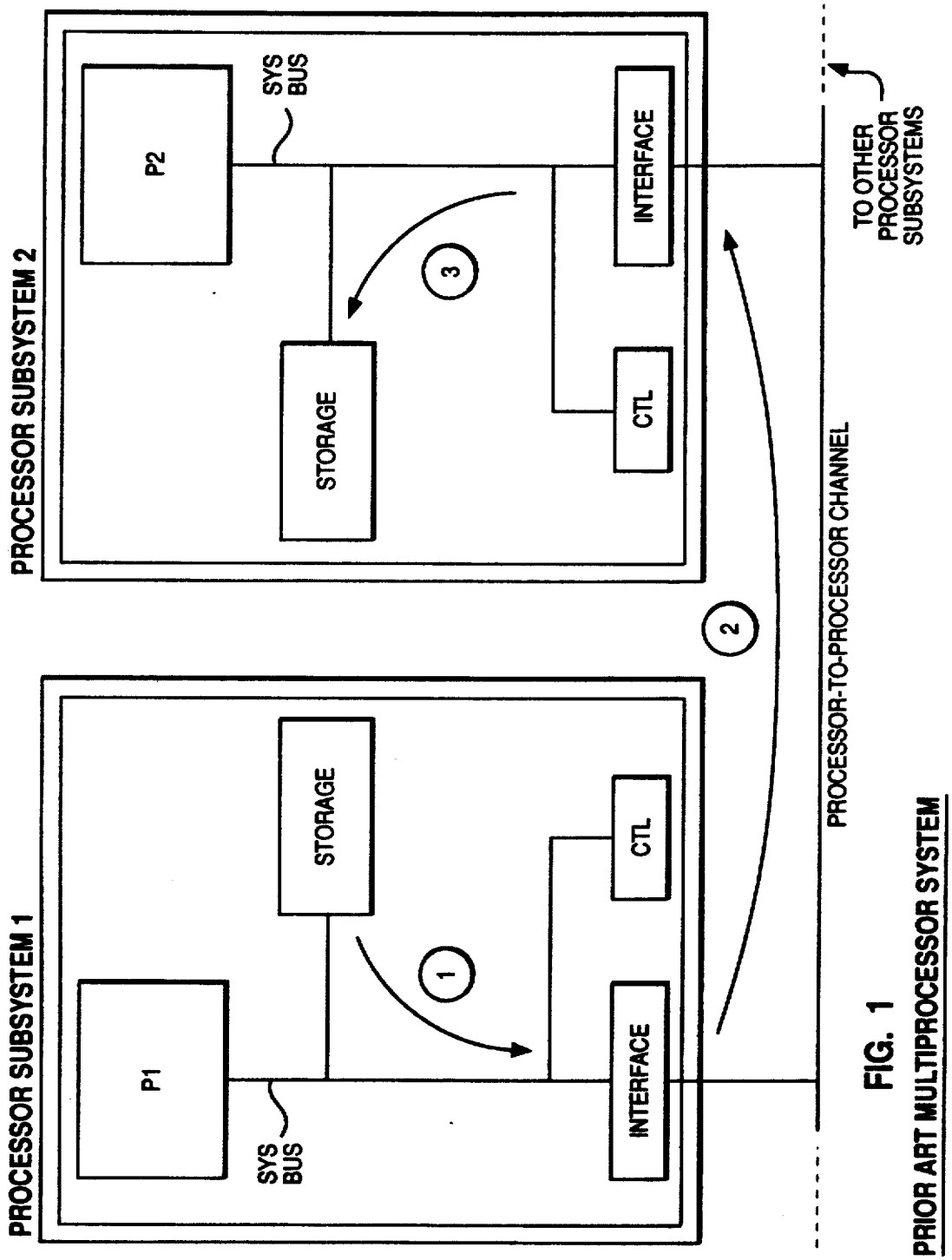
FIG. 1 is a block diagram showing a prior art multiprocessor data processing system.
Figure 2:
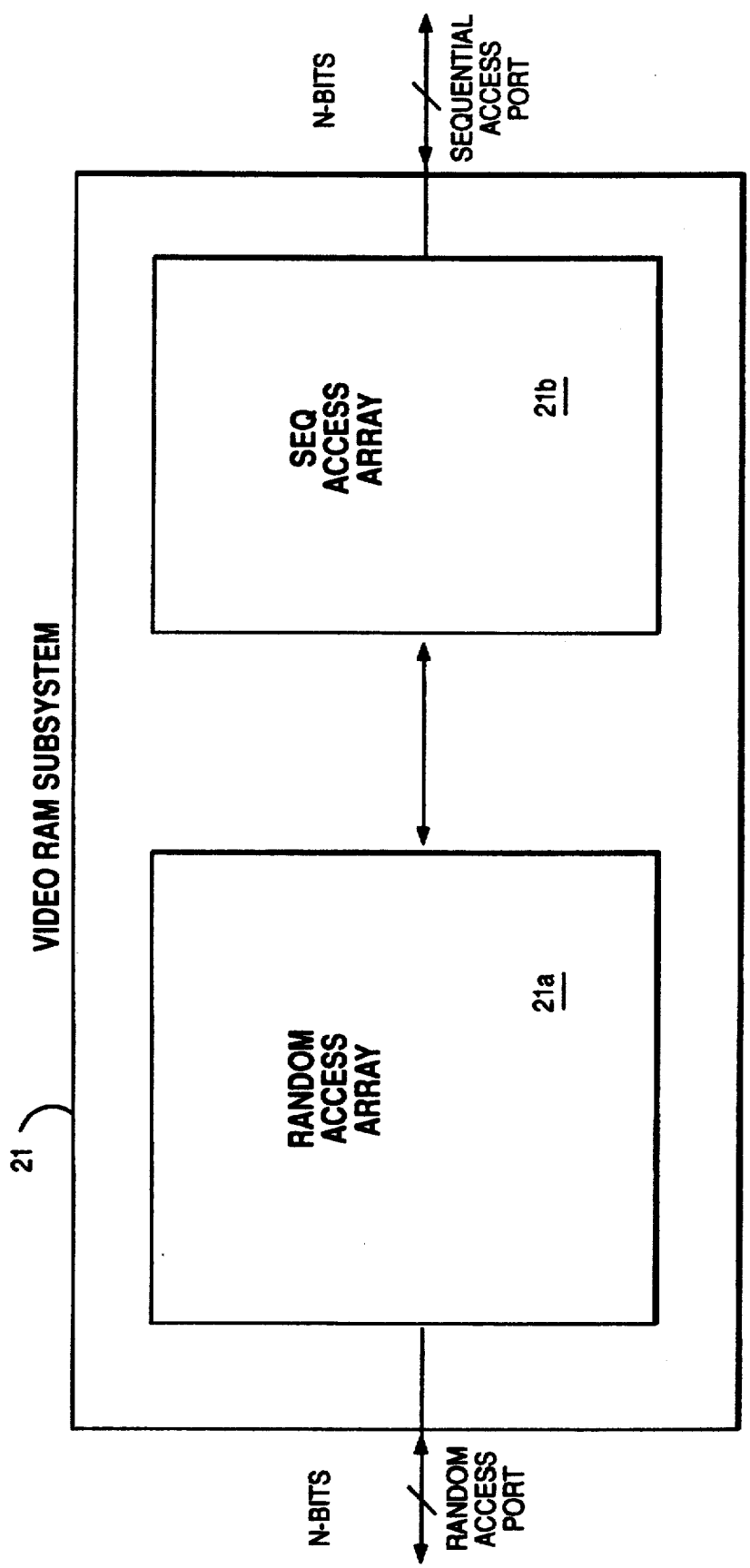
FIG. 2 is a schematic representation of a video RAM subsystem employed in the present invention.

By assembling the video RAMs (31-1 to 31-X, 41-1 to 41-X) into a parallel structure of N bits (where N=8, 16, 32...), the serial port takes on the attributes of a sequentially accessible port of width N. As shown in FIG. 2, the storage 21 can be viewed as two independent RAMs, a "low" speed random access RAM 21a and a smaller "high" speed sequential access RAM 21b.

A multiprocessor communications channel can be constructed by connecting the data bus of the channel to the sequential access port of the video RAM. Such a system will have the following desirable attributes. There will be zero interference to either processor during the time of the actual data transfer. Both processors are in a state of near 100% availability for the execution of any application or I/O task. This is in contrast to the lock out or reduced instruction execution of a conventional system in the prior art examples. The involvement of the processor for set up and end-of-transmission service is dependent on a given implementation and can be as low as 10-20 instructions.

Figure 3:
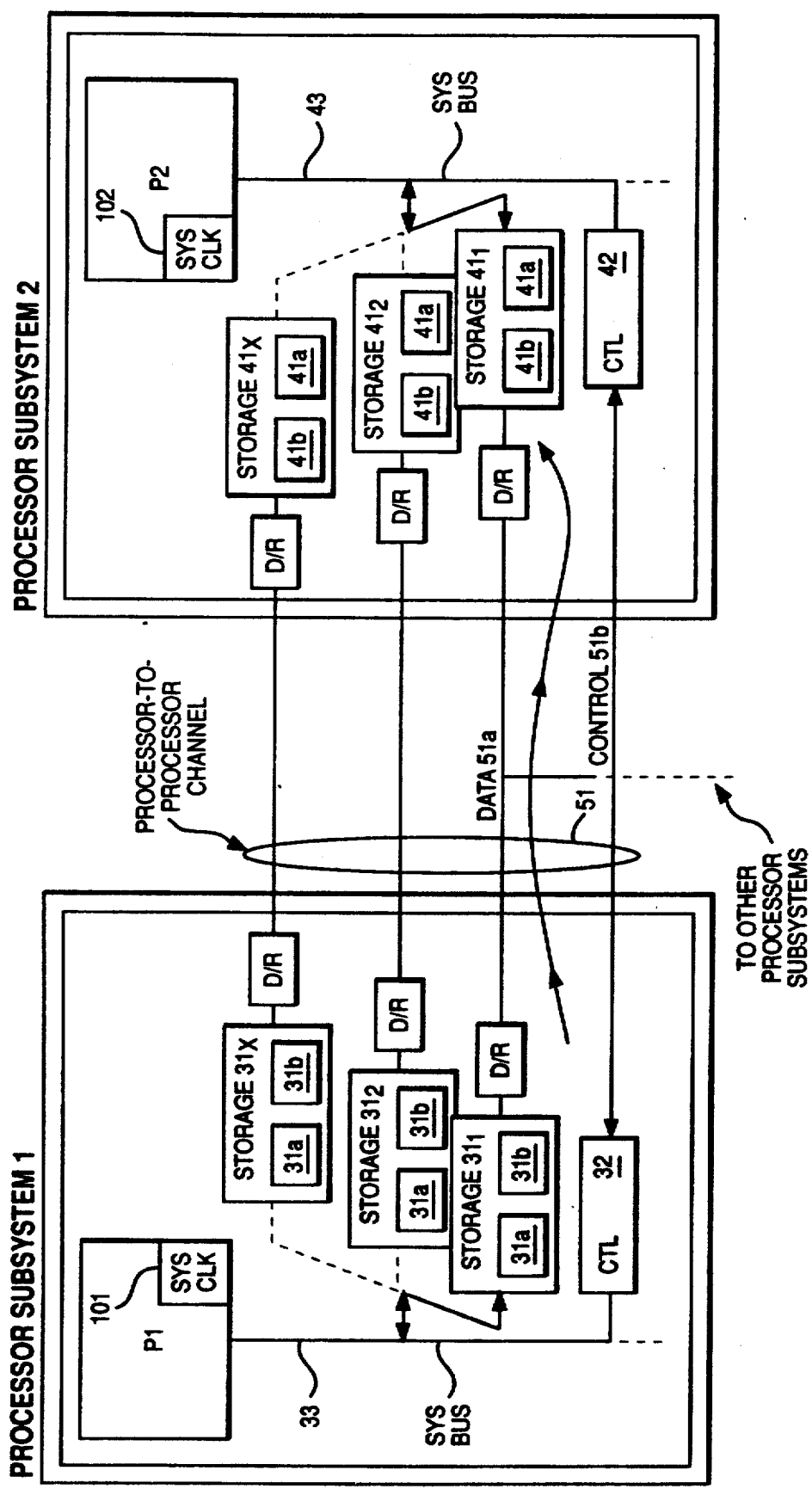
FIG. 3 is a block diagram of a multiprocessor data processing system in accordance with the present invention.

FIG. 3 is a block diagram showing the data flow for a processor-to-processor transfer utilizing the video RAM mechanism in accordance with the present invention. The following describes one possible sequence of events to effect a message (data) transfer from the storage 31a of processor P1 to the storage 41a of processor P2. The message may consist of multiple "blocks" of data with a "block" being equal to the number of bits in the sequential RAM 21b of FIG. 2. The operation would proceed as follows:

1. A task executing in P1 which requires the transfer of information to P2 will cause the sequential RAM 31b to be loaded with the appropriate data block from RAM array 31a and inform the channel control network 32 to transfer the information.

2. The channel control network 32 using the appropriate signalling protocol will request use of the processor-to-processor channel 51 and establish a communication link with the channel control network 42 of processor P2 through line 51b.

3. Once the communication link between the channel control networks 32 and 42 is established, data can then be clocked by data clock 103 (FIG. 4) through the driver/receiver (D/R) out of the sequential RAM 31b and into the sequential RAM 41b, using the link designated 51a in FIG. 3 and employing the protocol required by the video RAM.

4. Once the entire contents of the sequential RAM 31b (a "block" of data) have been transferred into sequential RAM 41b, the operation of movement of data on the channel will be suspended. This will permit time for the channel control network 42 of processor P2 to transfer the contents of the sequential RAM 41b into the RAM array 41a, requiring one access at the random access port of the video RAM using the appropriate video RAM protocol and then prepare to receive another "block" of data. At the same time, channel control network 32 of processor P1 will transfer the next "block" of data from the RAM array 31a into the sequential RAM 31b, requiring one access at the random access port of the video RAM using the appropriate video RAM protocol in preparation of the next transfer over the channel. The suspension of the data transfer over the channel will be accommodated through the protocol of the channel. If this was the last data "block" of the message to be transferred over the channel, the operation would be terminated by the control network 32 of processor P1; otherwise it would continue as described above.

As shown in FIG. 3, data is transferred between the sequential RAM ports of the respective video RAMs and does not utilize either the internal system bus 33 of processor P1 or system bus 43 of processor P2. Access to the system buses 33 or 43 is required only during the transfer of data internal to the video RAMs and is limited to one storage cycle per sequential access array transfer. Depending on the implementation, the availability of the system for instruction processing and other I/O activity can be as much as 99%. For example, in a system utilizing a 32 bit processor-to-processor channel 51 and a 100 ns data clock 103, a continuous rate of 40M bytes/sec can be sustained while encountering a total interference of less than 1%, as shown in Table 1 below.

Figure 4:
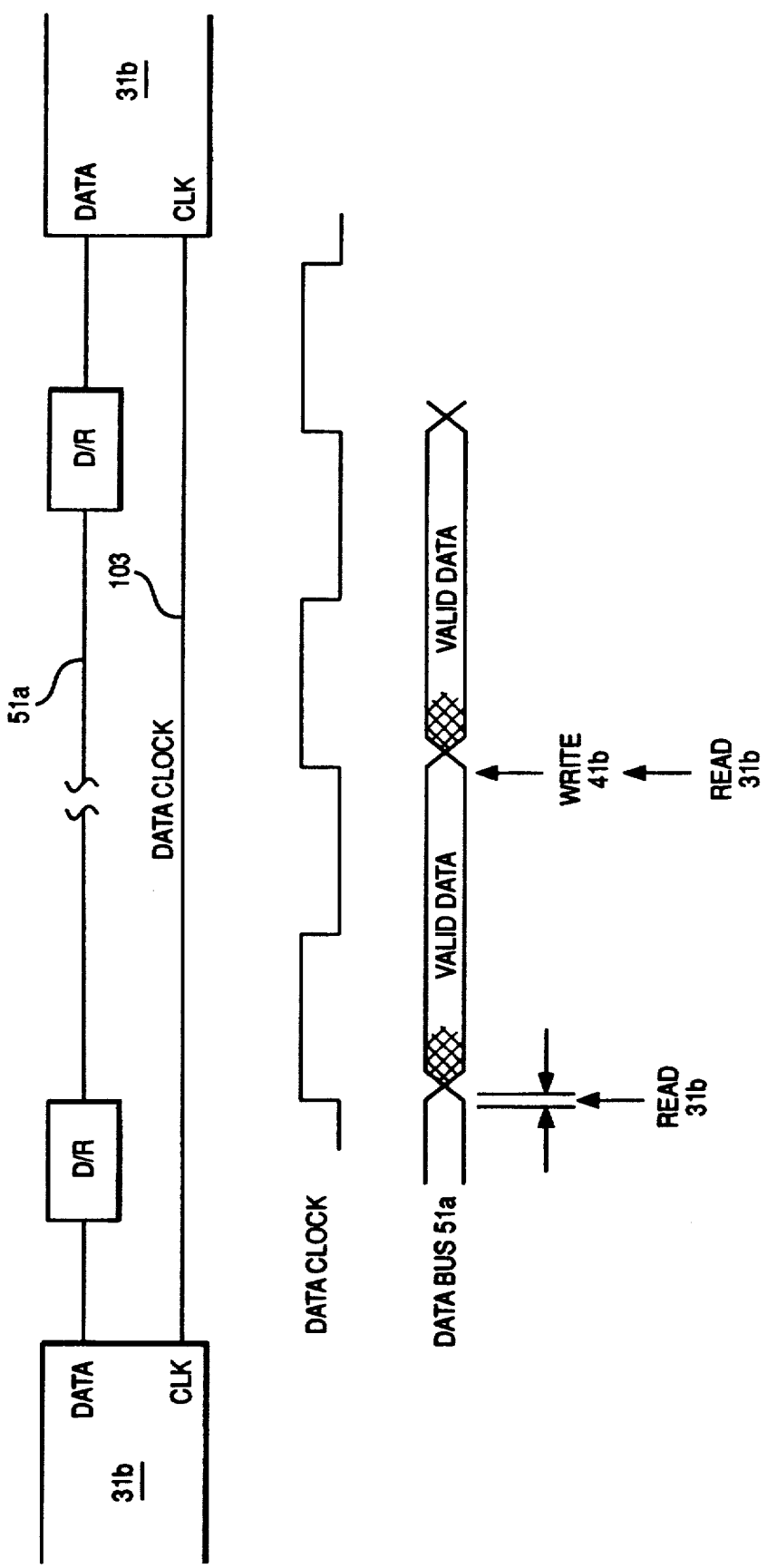
FIG. 4 is a timing diagram illustrating the transfer of data between two sequential access video RAM elements.

It should also be noted that during the actual transfer of data, the processor-to-processor channel can operate in a synchronous manner and an asynchronous manner to either of the respective processors. The transfer of data out of memory 31b and into memory 41b can operate under the control of a single data clock 103, as shown in FIG. 4. This greatly simplifie the control networks 32 and 42 over a conventional transfer mechanism. The operation is required to synchronize to the respective processor clocks 101, 102 (FIG. 5) at the suspension points where access to the random access ports of memories 31a and 41a is required.

TABLE 1

Interference calculations

Assumptions:
1. Processor-to-processor transfer rate is 100 NS/Transfer
2. Transfer word size = 4 bytes (32 bits)
3. The random access array to/from sequential access array transfers size of 256 words (or 1024 bytes)
4. A storage access cycle = 250 NS $$\text{Transfer Rate} = \frac{4 \text{ Bytes}}{\text{Transfer}} \times \frac{\text{Transfer}}{100 \text{ NS}}$$
$$= 40 \text{ M Bytes/sec}$$

$$\text{Interference} = \frac{250 \text{ NS}}{\text{Stg Cycle}} \times \frac{\text{Stg Cycle}}{(100) \times (256)} \times 100\%$$
$$= .9766\%$$

We claim:

1. Apparatus for transferring data between a pair of data processors in a data processing system, said apparatus comprising:

a system bus associated with each of said data processors for transmitting bits of data and instructions to and from its associated processor, each of said data processors having system clock means and at least one memory, each said at least one memory having a random access portion and a sequential access portion which can be coupled with said random access portion, said random access portion of said at least one memory containing blocks of said bits of data;

control means for each of said at least one memory for controlling operations thereof;

means for coupling said random access portion of each of said at least one memory to said sequential access portion thereof to provide bidirectional data flow therebetween;

means for uncoupling each said random access portion from each said sequential access portion to which it is coupled, after completion of said data flow therebetween;

transfer means for each said control means for transferring said blocks of data parallel by bit between each of said random access portions of each of said at least one memory and each said sequential access portion thereof when said random access portions and said sequential access portions are coupled;

means for connecting by said control means said sequential access portion of each of said at least one memory of one of said data processors to a sequential access portion of said at least one memory of the other of said processors when said random access portions and said sequential access portion are uncoupled; and sequential access clock means substantially independent of said system clock means for controlling bidirectional data flow serial by bit between said connected sequential access portions without involving said data processor and said system buses.

2. A system in accordance with claim 1 in which said sequential access clock means clocks said data flow between said sequential access portions asynchronously of said system buses and said processors.

* * * * *